(12) United States Patent
Chang

(10) Patent No.: US 8,804,072 B2
(45) Date of Patent: Aug. 12, 2014

(54) BACKLIGHT MODULE AND LIQUID CRYSTAL DISPLAY

(75) Inventor: Kuangyao Chang, Shenzhen (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 199 days.

(21) Appl. No.: 13/512,569

(22) PCT Filed: Apr. 11, 2012

(86) PCT No.: PCT/CN2012/073766
§ 371 (c)(1),
(2), (4) Date: May 29, 2012

(87) PCT Pub. No.: WO2013/149407
PCT Pub. Date: Oct. 10, 2013

(65) Prior Publication Data
US 2013/0265524 A1    Oct. 10, 2013

(30) Foreign Application Priority Data
Apr. 5, 2012  (CN) .......................... 2012 1 0097540

(51) Int. Cl.
*G02F 1/1335* (2006.01)

(52) U.S. Cl.
USPC ................................................ 349/65; 349/64

(58) Field of Classification Search
None
See application file for complete search history.

(56) References Cited

U.S. PATENT DOCUMENTS

2003/0043314 A1 *  3/2003  Lee et al. .......................... 349/65

* cited by examiner

*Primary Examiner* — Lucy Chien

(57) ABSTRACT

The present invention discloses a backlight module and a liquid crystal display. The reflection surface and the light emitting surface of a light guide plate have two bottom surfaces and two lateral surfaces located therebetween. The two bottom surface comprises a supporting surface. The backlight module further comprises a support post. The supporting surface has an inclined contact surface disposed thereon. The support post is attached to the inclined contact surface. A gravitational force is in a direction parallel to a length of a light source. The force acting between the light guide plate and the support post is formed when a change of the light guide plate occurs along the gravitational force. The support post can push the light guide plate toward the light source under the acting force.

12 Claims, 4 Drawing Sheets

BACKLIGHT MODULE AND LIQUID CRYSTAL DISPLAY

TECHNICAL FIELD OF THE INVENTION

The present invention relates to a liquid crystal display technology, and more particularly, to a backlight module and a liquid crystal display.

BACKGROUND OF THE INVENTION

Among various types of backlight modules, a single-side light entry type is now used more and more widely. Since it merely needs to dispose a light source at one side of a light guide plate for the single-side light entry type, the number of printed circuit boards, heat dissipation lumps for source of light, light sources, light driving boards, components, channels, conductive lines, and connectors can be reduced and it is convenient for the assembly.

Referring to FIG. 1, FIG. 1 is a top view of a conventional backlight module of a single-side light entry type. Specifically, the aforesaid conventional backlight module is of a single-long-side light entry type.

The backlight module comprises a light source 11 and a light guide plate 12. The light source 11 has an elongated shape. The light guide plate 12 comprises a long edge 121 and a short edge 122. The light source 11 is disposed corresponding to the long edge 121. The light source 11 and the light guide plate 12 have positioning posts 13 disposed therebetween.

Since the light guide plate 12 is made of a plastic material, the plastic material will be changed or affected by external circumstance. Take a Poly(methyl methacrylate) (i.e., PMMA) for example. Under a moist circumstance, the water absorption of PMMA may reach 2% in weight and the volume of the light guide plate 12 is caused to change. The water absorption rate is a percentage of the weight of absorbed water out of the net weight of material when the material is saturated with water. For example, if the original width of the light guide plate 12 is 395 mm, the light guide plate 12 may be increased for 1.62 mm in width once the water absorption rate reaches 2%. Also, the light guide plate 12 may be caused to change by an excessive temperature under a high-temperature circumstance.

When the light guide plate 12 is caused to change, the change direction is along a gravitational direction A' of the light guide plate 12 due to the action of gravity of the light guide plate 12 itself. In order to maintain the coupling efficient for the light guide plate 12, a minimum distance L' for coupling light generally has to be maintained between the light source 11 and the light guide plate 12, in a direction B' of light coupling (i.e., a light entry direction of the light guide plate 12).

Referring to FIG. 1, in the single-long-side light entry type, the gravitational direction A' of the light guide plate 12 and the light coupling direction B' are parallel to each other. Even though the light guide plate 12 is caused to change (e.g., volume increased) due to external conditions, the change direction is along the gravitational direction A' of the light guide plate 12. Therefore, this may make the light guide plate 12 closer to the light source 11. With the separation of the positioning posts 13, it can make sure that the minimum distance L' for coupling light is maintained between the light source 11 and the light guide plate 12, thereby realizing the highest coupling efficiency and assuring that the light guide plate 12 would not touch the light source 11.

Referring to FIG. 2, however, in a single-short-side light entry type, the light source is disposed at the short edge 122 of the light guide plate 12. The gravitational direction A' of the light guide plate and the light coupling direction B' are perpendicular to each other. When the light guide plate 12 is caused to change due to external conditions, the change direction is still along the gravitational direction A' of the light guide plate 12. At this moment, it may not make sure that the minimum distance L' for coupling light is maintained between the light source 11 and the light guide plate 12. Also, this may further cause the light guide plate 12 to rotate, thereby causing coupling loss and decreasing brightness uniformity.

Above all, in the single-short-side light entry type, the gravitational direction of the light guide plate is perpendicular to the light coupling direction. When the light guide plate is caused to change along the gravitational direction, it may not ensure the minimum distance for coupling light between the light source and the light guide plate and this affects the coupling efficiency.

SUMMARY OF THE INVENTION

An objective of the present invention is to provide a backlight module, for solving the technical problem of coupling efficiency in a conventional backlight module of a single-short-side light entry type. In the single-short-side light entry type, the gravitational direction of the light guide plate is perpendicular to the light coupling direction. When the light guide plate is caused to change along the gravitational direction, it may not ensure the minimum distance for coupling light between the light source and the light guide plate and this affects the coupling efficiency.

To solve the above problem, the present invention provides a backlight module, which comprises a light guide plate and a light source, the light guide plate comprises a reflection surface and a light emitting surface, in which the reflection surface and the light emitting surface have two bottom surfaces and two lateral surfaces located therebetween, the two bottom surface comprises a supporting surface, the light source has an elongated shape and is disposed corresponding to one of the lateral surfaces of the light guide plate, the light source and the light guide plate have a positioning post disposed therebetween, wherein the backlight module further comprises a support post, the supporting surface has an inclined contact surface disposed thereon, and the support post is attached to the inclined contact surface; wherein a gravitational force is in a direction parallel to a length of the light source, a force acting between the light guide plate and the support post is formed when a change of the light guide plate occurs along the gravitational force, the support post pushes the light guide plate toward the light source under the acting force, the support post also supports the light guide plate along a direction opposite to the gravitational force.

In the backlight module of the present invention, the positioning post has a diameter that is equal to a minimum distance for coupling light, the minimum distance for coupling light not only makes the light guide plate and the light source separated but also allows a maximum amount of light emitting from the light source to enter the light guide plate.

In the backlight module of the present invention, the inclined contact surface is formed by sinking a portion of the supporting surface, and the inclined contact surface has a specific slope.

In the backlight module of the present invention, the inclined contact surface is formed by sinking a portion of the supporting surface, and the inclined contact surface is a curved surface.

In the backlight module of the present invention, the inclined contact surface is formed by tilting the whole supporting surface, and the inclined contact surface has a specific slope.

In the backlight module of the present invention, the supporting surface comprises a first supporting surface and a second supporting surface, and the first supporting surface and the second supporting surface are inclined in opposite directions.

In the backlight module of the present invention, the number of the positioning post disposed between the light source and the light guide plate is two, the two positioning posts are respectively disposed at two ends of the elongated light source and are disposed between the light source and the light guide plate.

In the backlight module of the present invention, the backlight module further comprises a back plate, the supporting post is fastened to the back plate.

Another objective of the present invention is to provide a backlight module, for solving the technical problem of coupling efficiency in a conventional backlight module of a single-short-side light entry type. In the single-short-side light entry type, the gravitational direction of the light guide plate is perpendicular to the light coupling direction. When the light guide plate is caused to change along the gravitational direction, it may not ensure the minimum distance for coupling light between the light source and the light guide plate and this affects the coupling efficiency.

To solve the above problem, the present invention provides a backlight module, which comprises a light guide plate and a light source, the light guide plate comprises a reflection surface and a light emitting surface, in which the reflection surface and the light emitting surface have two bottom surfaces and two lateral surfaces located therebetween, the two bottom surface comprises a supporting surface, the light source has an elongated shape and is disposed corresponding to one of the lateral surfaces of the light guide plate, wherein the backlight module further comprises a support post, the supporting surface has an inclined contact surface disposed thereon, and the support post is attached to the inclined contact surface; wherein a gravitational force is in a direction parallel to a length of the light source, a force acting between the light guide plate and the support post is formed when a change of the light guide plate occurs along the gravitational force, the support post pushes the light guide plate toward the light source under the acting force.

In the backlight module of the present invention, the light source and the light guide plate have a positioning post disposed therebetween, the positioning post has a diameter that is equal to a minimum distance for coupling light, the minimum distance for coupling light not only makes the light guide plate and the light source separated but also allows a maximum amount of light emitting from the light source to enter the light guide plate.

In the backlight module of the present invention, the inclined contact surface is formed by sinking a portion of the supporting surface, and the inclined contact surface has a specific slope.

In the backlight module of the present invention, the inclined contact surface is formed by sinking a portion of the supporting surface, and the inclined contact surface is a curved surface.

In the backlight module of the present invention, the inclined contact surface is formed by tilting the whole supporting surface, and the inclined contact surface has a specific slope.

In the backlight module of the present invention, the supporting surface comprises a first supporting surface and a second supporting surface, and the first supporting surface and the second supporting surface are inclined in opposite directions.

In the backlight module of the present invention, when the light guide plate changes along the gravitational force, the acting force is formed between the light guide plate and the support post, and the support post supports the light guide plate along a direction opposite to the gravitational force under the acting force.

In the backlight module of the present invention, the number of the positioning post disposed between the light source and the light guide plate is two, the two positioning posts are respectively disposed at two ends of the elongated light source and are disposed between the light source and the light guide plate.

In the backlight module of the present invention, the backlight module further comprises a back plate, the supporting post is fastened to the back plate.

Still another objective of the present invention is to provide a liquid crystal display, for solving the technical problem of coupling efficiency in a conventional backlight module of a single-short-side light entry type. In the single-short-side light entry type, the gravitational direction of the light guide plate is perpendicular to the light coupling direction. When the light guide plate is caused to change along the gravitational direction, it may not ensure the minimum distance for coupling light between the light source and the light guide plate and this affects the coupling efficiency.

To solve the above problem, the present invention provides a liquid crystal display, which comprises a backlight module, the backlight module comprises a light guide plate and a light source, the light guide plate comprises a reflection surface and a light emitting surface, in which the reflection surface and the light emitting surface have two bottom surfaces and two lateral surfaces located therebetween, the two bottom surface comprises a supporting surface, the light source has an elongated shape and is disposed corresponding to one of the lateral surfaces of the light guide plate, wherein the backlight module further comprises a support post, the supporting surface has an inclined contact surface disposed thereon, and the support post is attached to the inclined contact surface; wherein a gravitational force is in a direction parallel to a length of the light source, a force acting between the light guide plate and the support post is formed when a change of the light guide plate occurs along the gravitational force, the support post pushes the light guide plate toward the light source under the acting force.

Compared to the conventional skills, the technical scheme provided in the present invention is to arrange the inclined contact surface on the supporting surface of the light guide plate and arrange the supporting post attached to the inclined contact surface. The inclined contact surface has a slant direction that is in accord with the light incident direction. When the light guide plate is changed along the gravitational direction, the acting force between the support post and the inclined contact surface will push the light guide plate toward the light source, thereby maintaining the minimum distance for coupling light between the light source and the light guide plate and assuring the coupling efficiency.

To make above content of the present invention more easily understood, it will be described in details by using preferred embodiments in conjunction with the appending drawings.

DETAILED DESCRIPTION OF THE INVENTION

The following descriptions for the respective embodiments are specific embodiments capable of being implemented for illustrations of the present invention with referring to appended figures.

Figure 1:
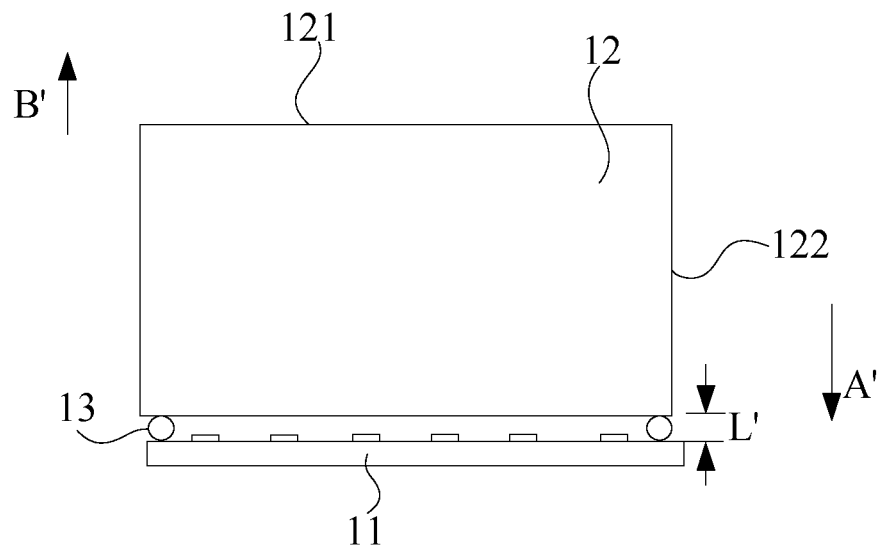
FIG. 1 is a schematic structural diagram showing a conventional backlight module of a single-long-side light entry type.
Figure 2:
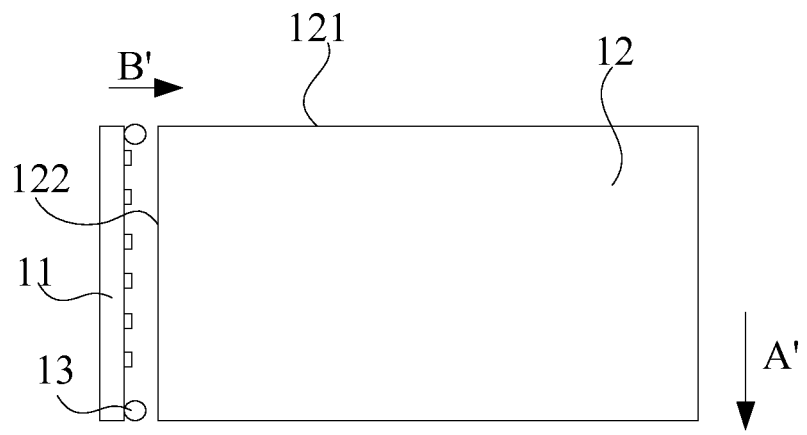
FIG. 2 is a schematic structural diagram showing a conventional backlight module of a single-short-side light entry type.
Figure 3:
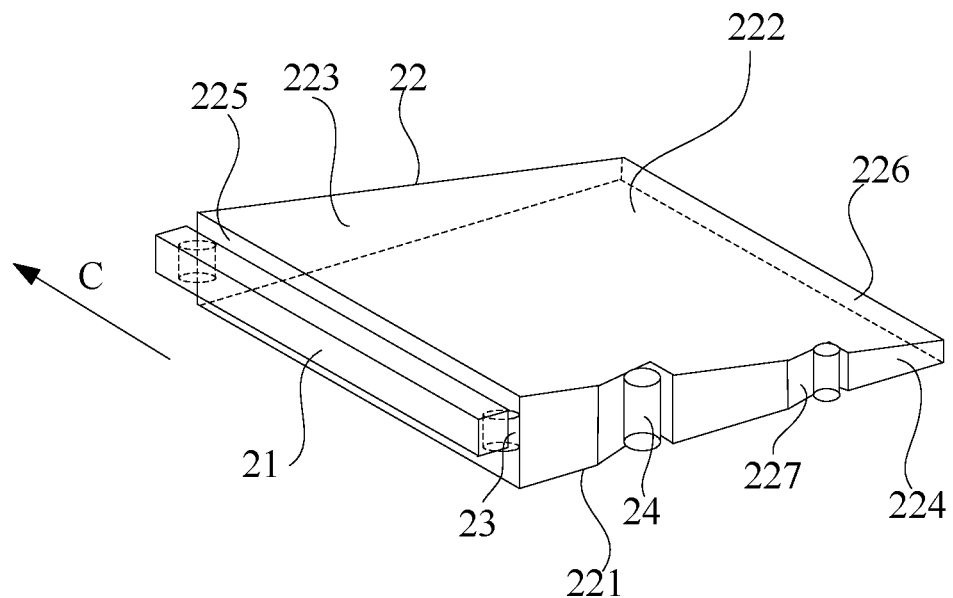
FIG. 3 is a schematic structural diagram showing a backlight module according to a first preferred embodiment of the present invention.
Figure 4:
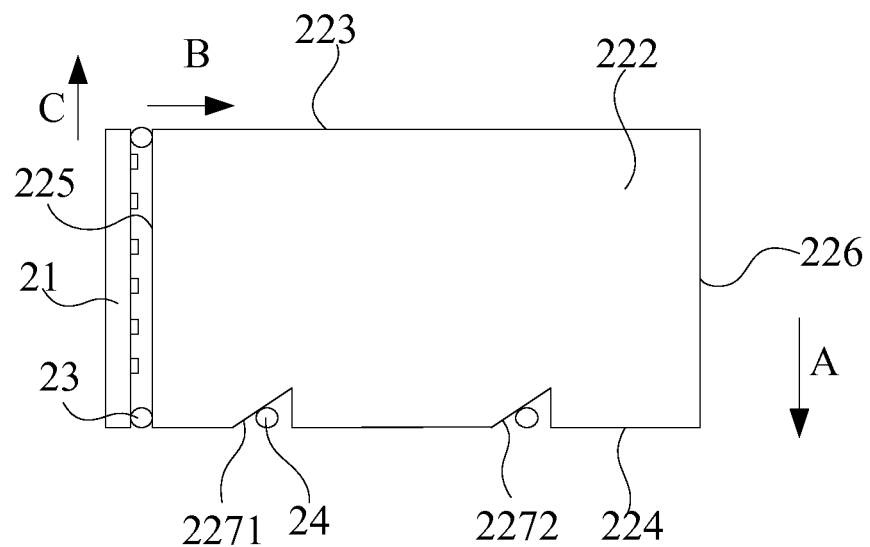
FIG. 4 is a top view of FIG. 3.

Referring to FIG. 3, FIG. 3 is a schematic structural diagram showing a backlight module according to a first preferred embodiment of the present invention. FIG. 4 is a top view of FIG. 3. The backlight module comprises a light source 21, a light guide plate 22, a positioning post 23, and a supporting post 24.

The light guide plate 22 comprises a reflection surface 221 and a light emitting surface 222. The reflection surface 221 and the light emitting surface 222 have an upper bottom surface 223, a supporting surface 224, a left lateral surface 225, and a right lateral surface 226 located therebetween, wherein the length of the upper bottom surface 223 or the supporting surface 224 is greater than that of the left lateral surface 225 or the right lateral surface 226.

The supporting surface 224 has an inclined contact surface 227 disposed thereon. The inclined contact surface 227 has a slant direction that is in accord with the light incident direction (see below for more detail description). In the first preferred embodiment, the inclined contact surface 227 is formed by sinking a portion of the supporting surface 224 (to be a triangle). The inclined contact surface 227 also can be formed by other ways, for example, formed by a triangle protruding from a portion of the supporting surface 224. A detailed description as to this is omitted herein.

The support post 24 is attached to the inclined contact surface 227. In the first preferred embodiment shown in FIG. 3, the inclined contact surface 227 has a specific slope. The supporting surface 227 comprises a first inclined contact surface 2271 and a second inclined contact surface 2272.

Referring to FIG. 4, a vertical incident direction B is a direction that light rays emits from the light source 21 and enters the left lateral surface 225 vertically. The first inclined contact surface 2271 and the direction B form a specific angle θ (see FIG. 5) and the first inclined contact surface 2271 has a specific first slope µ1; similarly the second inclined contact surface 2272 and the direction B form a specific angle θ and the second inclined contact surface 2272 has a specific second slope µ2. The first slope µ1 is equal to the second slope µ2.

Referring to FIG. 3 and FIG. 4, the light source 21 has an elongated shape or an elongated regular shape. The lengthwise direction of the light source 21 is indicated as C. The light source 21 is disposed corresponding to the left lateral surface 225 of the light guide plate 22. The light rays emitted from the light source 21 enter the light guide plate 22 via the left lateral surface 225, are reflected by the reflection surface 221, and then emit out from the light emitting surface 222.

In the first preferred embodiment shown in FIG. 3, the backlight module comprises two positioning posts 23, which are respectively disposed at two ends of the elongated light source 21 and are disposed between the light source 21 and the light guide plate 22. Each of the positioning posts 23 has a diameter Q (not labeled in the drawings). The diameter Q is equal to a minimum distance M for coupling light between the light source 21 and the light guide plate 22.

The aforesaid minimum distance M for coupling light not only makes the light guide plate 22 and the light source 21 separated from each other but also allows a maximum amount of light emitting from the light source 21 to enter the light guide plate 22. For example, the minimum distance M for coupling light ranges from 0.15 mm to 0.4 mm.

Figure 5:
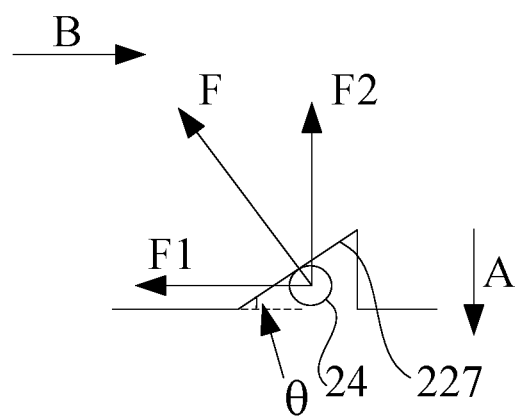
FIG. 5 is a schematic diagram showing force components between a support post and an inclined contact surface in the present invention.

Referring to FIG. 5, the gravitational force exerted on the light guide plate 22 is in a direction A that is parallel to the lengthwise direction C of the light source 21 and is perpendicular to the direction B. When a change of the light guide plate 22 occurs along the gravitational direction A (e.g., the percent of water absorption reaches 2% in weight and this makes the volume grow along the gravitational direction A), the light guide plate 22 will exert a force or a pressure on the support post 24 due to the gravitational force. Under the pressure, the support post 24 exerts an acting force F to the inclined contact surface 227 of the light guide plate 22. The acting force F is perpendicular to the inclined contact surface 227 and can be divided into component forces, i.e., a pushing force F1 and a supporting force F2. The pushing force F1 is in a direction opposite to the direction B and is utilized to push the light guide plate 22 toward the light source 21. The supporting force F2 is in a direction opposite to the gravitational direction A and is utilized to support the light guide plate 22.

In the present embodiment, the backlight module further comprises a back plate (not shown). The support post 23 is fastened to the back plate.

The first preferred embodiment shown in FIG. 3 to FIG. 5 works as follows.

In the working process of the backlight module, a change (e.g., volume increased) of the light guide plate 22 occurs along the gravitational direction A once influenced by external conditions such as the moisture or the increased temperature. The moist circumstance may make the water absorption of the light guide plate 22 reach 2% in weight.

At this moment, the light guide plate 22 will exert a force or a pressure on the support post 24 due to the gravitational force. Under the pressure, the support post 24 will exert an acting force F to the inclined contact surface 227 of the light guide plate 22. The acting force F is perpendicular to the inclined contact surface 227 and may be divided into a pushing force F1 opposite to the direction B and a supporting force F2 opposite to the gravitational direction A. The pushing force F1 is utilized to push the light guide plate 22 toward the light source 21 and the supporting force F2 is utilized to support the light guide plate 22.

Obviously, the aforesaid action of pushing force F1 makes the light guide plate 22 move toward the light source 21.

Therefore, with the separation of the positioning posts 23, the light source 21 and the light guide plate 22 maintains the minimum distance M for coupling light therebetween. The minimum distance M for coupling light not only makes the light guide plate 22 and the light source 21 separated from each other but also allows a maximum amount of light emitting from the light source 21 to enter the light guide plate 22, thereby significantly assuring the coupling efficiency. Also, because of the support from the supporting force, the light guide plate 22 is unlikely to rotate.

Figure 6:
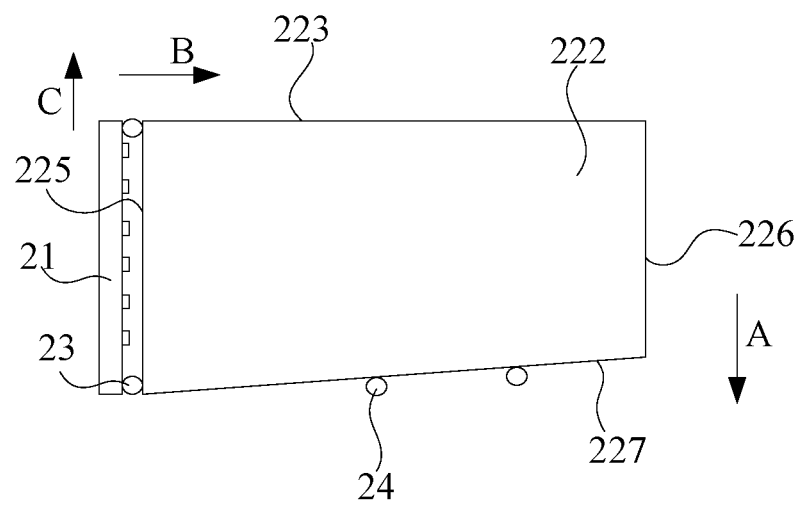
FIG. 6 is a top view of a backlight module according to a second preferred embodiment of the present invention.

FIG. 6 is a top view of a backlight module according to a second preferred embodiment of the present invention.

The difference between the second preferred embodiment shown in FIG. 6 and the first preferred embodiment shown in FIG. 3 is that the inclined contact surface 227 of the second preferred embodiment is formed by tilting the whole supporting surface 224 (also see FIG. 3). The inclined contact surface 227 and the direction B form a specific angle and the inclined contact surface has a specific slope.

Figure 7:
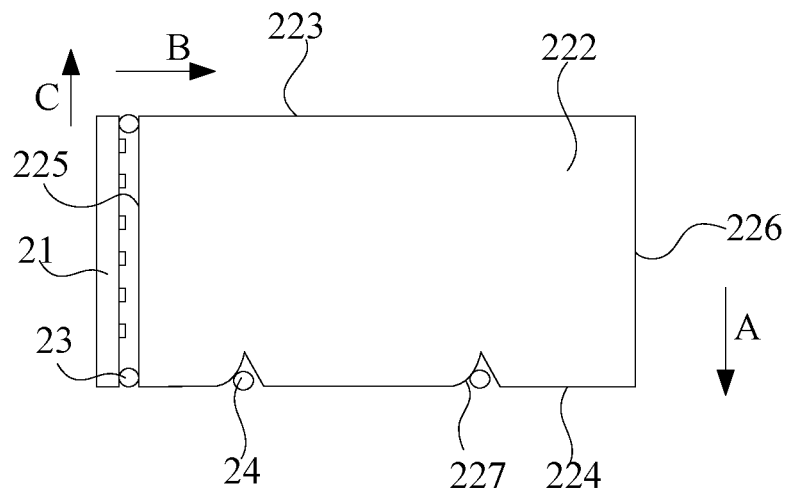
FIG. 7 is a top view of a backlight module according to a third preferred embodiment of the present invention.

FIG. 7 is a top view of a backlight module according to a third preferred embodiment of the present invention.

The difference between the third preferred embodiment shown in FIG. 7 and the first preferred embodiment shown in FIG. 3 is that the inclined contact surface 227 of the third preferred embodiment is formed by sinking a portion of the supporting surface 224 and the inclined contact surface 227 is a curved surface. The curved surface may have various slopes. The curved surface can be a curved surface having uniformly changed slopes and also can be formed by bending a plurality of planes. A detailed description as to this is omitted herein.

Figure 8:
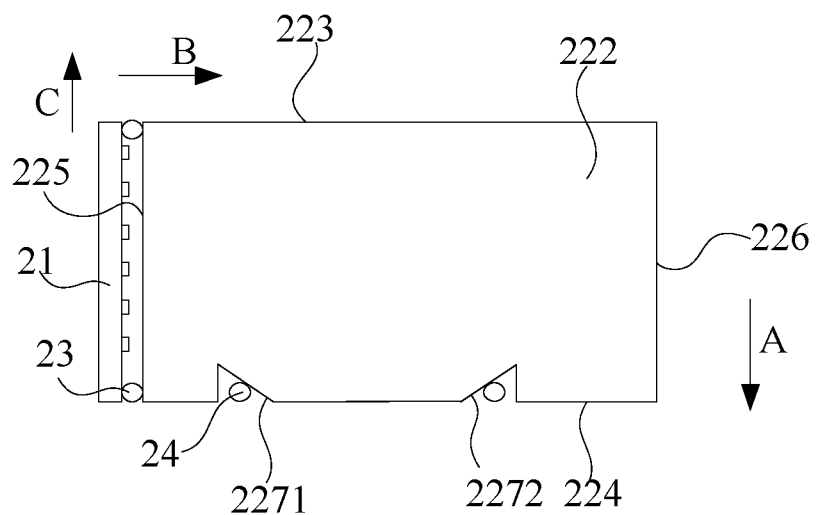
FIG. 8 is a top view of a backlight module according to a fourth preferred embodiment of the present invention.

FIG. 8 is a top view of a backlight module according to a fourth preferred embodiment of the present invention.

The difference between the fourth preferred embodiment shown in FIG. 8 and the first preferred embodiment shown in FIG. 3 is that the inclined contact surface 227 of the fourth preferred embodiment comprises a first inclined contact surface 2271 and a second inclined contact surface 2272, and the first inclined contact surface 2271 and the second inclined contact surface 2272 are inclined in opposite directions. That is, the first inclined contact surface 2271 is inclined in a counterclockwise direction and the second inclined contact surface 2272 is inclined in a clockwise direction.

The working processes of the second preferred embodiment to the fourth preferred embodiment are referred to the detailed descriptions of the first preferred embodiment shown in FIG. 3 to FIG. 5, and the related descriptions are omitted herein.

The present invention further provides a liquid crystal display. The liquid crystal display comprises the afore-mentioned backlight module of the present invention. Since the backlight module has been detailedly described above, the description as to this is omitted herein.

In the present invention, the provided technical scheme is to arrange the inclined contact surface on the supporting surface of the light guide plate and arrange the supporting post attached to the inclined contact surface. The inclined contact surface has a slant direction that is in accord with the light incident direction. When the light guide plate is changed along the gravitational direction, the acting force between the support post and the inclined contact surface will push the light guide plate toward the light source, thereby maintaining the minimum distance for coupling light between the light source and the light guide plate and assuring the coupling efficiency.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A backlight module, which comprises a light guide plate and a light source, the light guide plate comprises a reflection surface and a light emitting surface, in which the reflection surface and the light emitting surface have two bottom surfaces and two lateral surfaces located therebetween, the two bottom surface comprises a supporting surface, the light source has an elongated shape and is disposed corresponding to one of the lateral surfaces of the light guide plate, the light source and the light guide plate have a positioning post disposed therebetween, wherein:

the backlight module further comprises a support post, the supporting surface has an inclined contact surface disposed thereon, the inclined contact surface is formed by sinking a portion of the supporting surface, the inclined contact surface has a specific slope, and the support post is attached to the inclined contact surface;

wherein a gravitational force is in a direction parallel to a length of the light source, a force acting between the light guide plate and the support post is formed when a change of the light guide plate occurs along the gravitational force, the support post pushes the light guide plate toward the light source under the acting force, the support post also supports the light guide plate along a direction opposite to the gravitational force.

2. The backlight module according to claim 1, wherein the positioning post has a diameter that is equal to a minimum distance for coupling light, the minimum distance for coupling light not only makes the light guide plate and the light source separated but also allows a maximum amount of light emitting from the light source to enter the light guide plate.

3. The backlight module according to claim 1, wherein the supporting surface comprises a first supporting surface and a second supporting surface, and the first supporting surface and the second supporting surface are inclined in opposite directions.

4. The backlight module according to claim 1, wherein the number of the positioning post disposed between the light source and the light guide plate is two, the two positioning posts are respectively disposed at two ends of the elongated light source and are disposed between the light source and the light guide plate.

5. The backlight module according to claim 1, further comprising a back plate, the supporting post is fastened to the back plate.

6. A backlight module, which comprises a light guide plate and a light source, the light guide plate comprises a reflection surface and a light emitting surface, in which the reflection surface and the light emitting surface have two bottom surfaces and two lateral surfaces located therebetween, the two bottom surface comprises a supporting surface, the light source has an elongated shape and is disposed corresponding to one of the lateral surfaces of the light guide plate, wherein:

the backlight module further comprises a support post, the supporting surface has an inclined contact surface disposed thereon, the inclined contact surface is formed by sinking a portion of the supporting surface, the inclined contact surface has a specific slope, and the support post is attached to the inclined contact surface;

wherein a gravitational force is in a direction parallel to a length of the light source, a force acting between the light guide plate and the support post is formed when a change of the light guide plate occurs along the gravitational force, the support post pushes the light guide plate toward the light source under the acting force.

7. The backlight module according to claim 6, wherein the light source and the light guide plate have a positioning post disposed therebetween, the positioning post has a diameter that is equal to a minimum distance for coupling light, the minimum distance for coupling light not only makes the light guide plate and the light source separated but also allows a maximum amount of light emitting from the light source to enter the light guide plate.

8. The backlight module according to claim 6, wherein the supporting surface comprises a first supporting surface and a second supporting surface, and the first supporting surface and the second supporting surface are inclined in opposite directions.

9. The backlight module according to claim 6, wherein when the light guide plate changes along the gravitational force, the acting force is formed between the light guide plate and the support post, and the support post supports the light guide plate along a direction opposite to the gravitational force under the acting force.

10. The backlight module according to claim 6, wherein the number of the positioning post disposed between the light source and the light guide plate is two, the two positioning posts are respectively disposed at two ends of the elongated light source and are disposed between the light source and the light guide plate.

11. The backlight module according to claim 6, further comprising a back plate, the supporting post is fastened to the back plate.

12. A liquid crystal display, which comprises a backlight module, the backlight module comprises a light guide plate and a light source, the light guide plate comprises a reflection surface and a light emitting surface, in which the reflection surface and the light emitting surface have two bottom surfaces and two lateral surfaces located therebetween, the two bottom surface comprises a supporting surface, the light source has an elongated shape and is disposed corresponding to one of the lateral surfaces of the light guide plate, wherein:

the backlight module further comprises a support post, the supporting surface has an inclined contact surface disposed thereon, the inclined contact surface is formed by sinking a portion of the supporting surface, the inclined contact surface has a specific slope, and the support post is attached to the inclined contact surface;

wherein a gravitational force is in a direction parallel to a length of the light source, a force acting between the light guide plate and the support post is formed when a change of the light guide plate occurs along the gravitational force, the support post pushes the light guide plate toward the light source under the acting force.

* * * * *